United States Patent

Geibel et al.

[11] Patent Number: 6,082,380
[45] Date of Patent: Jul. 4, 2000

[54] PROCESS TO REMOVE POLY(ARYLENE SULFIDE) BASED DEPOSITS FROM AN ARTICLE

[75] Inventors: Jon F. Geibel; Richard A. Green, both of Bartelsville, Okla.

[73] Assignee: Phillips Petroleum Company, Bartlesville, Okla.

[21] Appl. No.: 09/305,971

[22] Filed: May 6, 1999

[51] Int. Cl.$^7$ .................................................. B08B 9/08
[52] U.S. Cl. ................................. 134/31; 134/2; 134/3; 134/22.17; 134/22.19; 134/25; 134/36; 134/40; 134/41; 134/38; 510/109; 510/202; 510/204; 510/213
[58] Field of Search ................................. 134/2, 3, 22.17, 134/22.19, 28, 31, 30, 36, 38, 40, 41; 510/109, 202, 204, 213

[56] References Cited

U.S. PATENT DOCUMENTS

| | | | |
|---|---|---|---|
| 4,425,288 | 1/1984 | Tieszen et al. | 264/39 |
| 4,431,457 | 2/1984 | Reed et al. | 134/2 |
| 4,435,221 | 3/1984 | Mathis et al. | 134/2 |
| 4,435,222 | 3/1984 | Reed et al. | 134/2 |
| 4,445,941 | 5/1984 | Mathis et al. | 134/3 |
| 4,874,635 | 10/1989 | Kerao et al. | 427/96 |
| 4,988,796 | 1/1991 | Cliffton et al. | 528/388 |
| 5,245,000 | 9/1993 | Bobsein | 528/171 |
| 5,334,701 | 8/1994 | Ash et al. | 528/486 |

*Primary Examiner*—Randy Gulakowski
*Assistant Examiner*—S. Carrillo
*Attorney, Agent, or Firm*—Polly C. Owen

[57] ABSTRACT

A process for the removal of poly(arylene sulfide) based deposits from an article by contacting said poly(arylene sulfide) based deposits with a polar aprotic compound, a base, an organosulfur compound having the formula:

$$R_1\text{—}S\text{—}S\text{—}R_2,$$

wherein $R_1$ and $R_2$ are hydrocarbon radicals having from 1 to 50 carbon atoms per radical, and optionally, a halogenated aromatic compound.

12 Claims, No Drawings

PROCESS TO REMOVE POLY(ARYLENE SULFIDE) BASED DEPOSITS FROM AN ARTICLE

FIELD OF THE INVENTION

This invention relates to a process for removing poly(arylene sulfide) based deposits from an article.

BACKGROUND OF THE INVENTION

In the production of poly(arylene sulfide) polymers, poly(arylene sulfide) based deposits can form on surfaces of production equipment. In addition, a batch of poly(arylene sulfide) polymer can gel in a reactor and have to be removed. Poly(arylene sulfide) based deposits can also form during subsequent processing of the poly(arylene sulfide) polymer, such as in synthetic fiber production. Machine parts utilized in processing the poly(arylene sulfide) polymer which have poly(arylene sulfide) based deposits must be cleaned for re-use. Such parts include, but are not limited to, spinnerettes, dies, pack parts, and filters.

These poly(arylene sulfide) based deposits can be removed mechanically, but the job is tedious and time consuming. Also, attempts to remove the poly(arylene sulfide) based deposits by "burn out" procedures have been made. For example, metal parts can be placed in a furnace to remove poly(arylene sulfide) based deposits. However, this "burn out" procedure is not suitable for removing poly(arylene sulfide) based deposits from all metal parts since the burn out can cause corrosion, warping, or other problems.

There is a need in the poly(arylene sulfide) industry for an efficient process to remove poly(arylene sulfide) based deposits from articles. This invention provides such a process.

SUMMARY OF THE INVENTION

It is an object of this invention to provide a process for removing poly(arylene sulfide) based deposits from an article.

In accordance with this invention, a process for removing poly(arylene sulfide) based deposits is provided said process comprising contacting said poly(arylene sulfide) based deposits with a polar aprotic compound, a base, an organo-sulfur compound having the formula:

$R_1$—S—S—$R_2$, where $R_1$ and $R_2$ can be the same or different and are selected from the group consisting of hydrocarbon radicals having from 1 to 50 carbon atoms per radical, and optionally, a halogenated aromatic compound.

These objects and other objects of this invention will become more apparent with reference to the following.

DETAILED DESCRIPTION OF THE INVENTION

In this invention, a process is provided for removing poly(arylene sulfide) based deposits from an article said process comprising contacting said poly(arylene sulfide) based deposits with a polar aprotic compound, a base, an organosulfur compound having the formula:

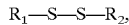

$R_1$—S—S—$R_2$, where $R_1$ and $R_2$ can be the same or different and are selected from the group consisting of hydrocarbon radicals having from 1 to 50 carbon atoms per radical, and optionally, a halogenated aromatic compound.

Poly(arylene sulfide) based deposits comprise poly(arylene sulfide) polymers. Poly(arylene sulfide) polymers can be prepared by any means known in the art. Generally, poly(arylene sulfide) polymers are prepared by reacting components comprising a polyhalo-substituted cyclic compound and an alkali metal sulfide in a polar organic compound. The poly(arylene sulfide) polymers which are preferred for use in this invention, because of their frequent occurrence in polymer production and processing, are those polymers which consist essentially of repeating units containing phenyl groups linked to one or more constituents selected from the group consisting of sulfur, oxygen, a ketone group, a biphenyl group, a sulfone group, and substituted and unsubstituted methyl groups. Most frequently, the poly(arylene sulfide) polymer is poly(phenylene sulfide) due to its widespread use in the industry. Said poly(arylene sulfide) based deposits can further comprise other contaminants, such as, but not limited to, metal sulfides, oxides and other salts.

Said article can be any type of manufacture including, but not limited to, process equipment, such as, reactor vessels, and subsequent processing equipment, such as, spinnerettes, dies, pack parts, and filters.

Said polar aprotic compound functions to provide a medium for contacting said base and said organo-sulfur compound. Said polar aprotic compound includes, but are not limited to, cyclic or acyclic organic amides having from 1 to about 10 carbon atoms per molecule. Exemplary polar aprotic compounds are selected from the group consisting of 1,3-dimethyl-2-imidazolidinone, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone (NMP), ε-caprolactam, N-methyl-ε-caprolactam, N,N'-ethylenedi-2-pyrrolidone, hexamethylphosphoramide, tetramethylurea, and mixtures thereof. The preferred polar aprotic compound is NMP due to its availability and ease of use.

Suitable bases for use in this invention are those strong enough to remove a proton from thiophenol. For example, said bases include, but are not limited to, sodium carbonate and alkali metal hydroxides selected from the group consisting of lithium hydroxide, sodium hydroxide, potassium hydroxide, rubidium hydroxide, cesium hydroxide, and mixtures thereof. The preferred base is sodium carbonate due to availability and ease of use.

Said organosulfur compound includes compounds having the formula:

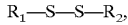

$R_1$—S—S—$R_2$, where $R_1$ and $R_2$ can be the the same or different and are selected from the group consisting of hydrogen and hydrocarbon radicals having from 1 to about 50 carbon atoms per radical. Preferably, said hydrocarbon radicals are selected from the group consisting of hydrogen and hydrocarbon radicals having from about 6 to about 24 carbon atoms. Most preferably, said hydrocarbon radicals are phenyl groups thus forming the compound, phenyl disulfide. Phenyl disulfide is highly efficient in removing said poly(arylene sulfide) based deposits.

The polar aprotic compound, base, organosulfur compound, and article are contacted at a sufficient temperature and for a sufficient contact time to remove said poly(arylene sulfide) based deposit. Preferably, said temperature should be in a range of about 150° C. to about 450° C.

Temperatures below about 150° C. may not cause removal of the poly(arylene sulfide) based deposits. Temperatures above 450° C. can cause unnecessary side reactions to occur. Most preferably, said temperature should be in a range of 200° C. to 280° C. Contact time varies and can depend on the amount of deposits to be removed, and the concentration of the organosulfur compound, base, and polar aprotic compound utilized.

Suitable halogenated aromatic compounds can be represented by the formula:

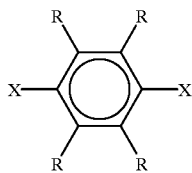

wherein X is a halogen, and R is selected from the group consisting of hydrogen, a halogen, alkyl, cycloalkyl, aryl, alkylaryl, and arylalkyl radicals having from about 6 to about 24 carbon atoms. Exemplary halogenated aromatic compounds include, but are not limited to, and are selected from the group consisting of p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-5-(3-methylcyclopentyl)-2,5-dichlorobenzene, and mixtures thereof. The preferred halogenated aromatic compound for use in this invention is p-dichlorobenzene, hereinafter referred to as DCB, due to availability and ease of use.

EXAMPLE

The following example is intended to be illustrative of the invention but is not meant to be construed as limiting the reasonable scope of the invention.

Example 1

The purpose of this example is to demonstrate that phenyl disulfide can be utilized to remove poly(phenylene sulfide), hereinafter referred to as "PPS", from a PPS molded part containing glass fibers.

To a 1 liter autoclave reactor, 0.0544 moles of sodium carbonate, 0.02723 moles of phenyl disulfide, and 3.00 moles of NMP were added. Then, a PPS molded part weighing 4.21 grams was placed in the reactor. The PPS molded part contained 40% by weight glass fiber.

Oxygen was removed from the reactor utilizing 5 pressure and release cycles of 50 psig nitrogen and 5 pressure and release cycles using 200 psig nitrogen. 40 psig of nitrogen pressure was then maintained in the reactor. The reactor was heated rapidly to 250° C. and held for 2 hours. Then, the reactor was cooled rapidly to room temperature. The reactor was opened, and a mixture was removed from the reactor using a vacuum flask attached to a vacuum pump by polyethylene tubing. Additional NMP was used to remove the mixture from the reactor. The mixture was filtered through a Buchner funnel with Fisher brand P8 filter paper. After essentially all of the liquid was filtered through the Buchner funnel, the solids were collected on the filter paper. The solids were removed from the filter paper by washing the solids several times with acetone and collecting the solids in another Buchner funnel containing filter paper. The solids were dried and then weighed. The solids weighed 5.03 grams. The solids were then washed with water several times and dried in a vacuum oven at 100° C. to produce water-washed solids. The weight of the water-washed solids was 1.41 grams.

These water-washed solids represented the glass fibers contained in the PPS molded part. 0.27 grams of the glass fibers were not recovered due to handling losses during the experiment. The PPS had been removed from the PPS molded part by contacting the PPS molded part with phenyl disulfide, sodium carbonate, and NMP.

That which is claimed is:

1. A process for the removal of poly(arylene sulfide) based deposits from an article, said process comprising contacting said poly(arylene sulfide) based deposits with a polar aprotic compound, a base, and organosulfur compound having the formula:

wherein $R_1$ and $R_2$ are hydrocarbon radicals having from 1 to 50 carbon atoms per radical, and optionally, a halogenated aromatic compound.

2. The process according to claim 1 wherein said poly(arylene sulfide) based deposits are poly(arylene sulfide) polymers consisting essentially of repeating units containing phenyl groups linked to one or more constituents selected from the group consisting of sulfur, oxygen, a ketone group, a biphenyl group, a sulfone group, and substituted and unsubstituted methyl groups.

3. The process according to claim 2 wherein said polar aprotic compound includes cyclic or acyclic organic amides having from 1 to about 10 carbon atoms per molecule.

4. The process according to claim 3 wherein said base includes sodium carbonate and alkali metal hydroxides selected from the group consisting of lithium hydroxide, sodium hydroxide, potassium hydroxide, rubidium hydroxide, cesium hydroxide, and mixtures thereof.

5. The process according to claim 4 wherein said hydrocarbon radicals in said organosulfur compound are selected from the goup consisting of hydrogen and hydrocarbon radicals having from about 6 to about 24 carbon atoms.

6. The process according to claim 5 wherein said polar aprotic compound is selected from the group consisting of 1,3-dimethyl-2-imidazolidinone, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-melhyl-ε-caprolactam, N,N'-ethylenedi-2-pyrrolidone, hexamethylphosphoramide, tetramethylurea, and mixtures thereof.

7. The process according to claim 6 wherein said halogenated aromatic compound is selected from the group consisting of p-dichlorobenzene, p-dibromobenzene p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibrornobenzene, 1-benzyl-2,5-dichlorobenzene, 1-octyl-5-(3-methylcyclopentyl)-2,5-dichlorobenzene, and mixtures thereof.

8. The process according to claim 7 wherein said base is sodium carbonate.

9. The process according to claim 8 wherein said organosulfur compound is phenyl disulfide.

10. The process according to claim 9 wherein said polar aprotic compound is N-methyl-2-pyrrolidone.

11. The process according to claim 10 wherein said halogenated aromatic compound is p-dichlorobenzene.

12. The process for the removal of poly(arylene sulfide) based deposits from an article, said process comprising contacting said poly(arylene sulfide) based deposits at a temperature in the range of about 150° C. to about 450° C. with a polar aprotic compound, a base, and an organosulfur compound having the formula:

$$R_1-S-S-R_2,$$

wherein $R_1$ and $R_2$ are hydrocarbon radicals having from 1 to 50 carbon atoms per radical, and optionally, a halogenated aromatic compound.

* * * * *